April 27, 1954  M. H. L. SÉDILLE  2,677,062
GAS TURBINE POWER PLANT
Original Filed Feb. 28, 1945
*fig:1*
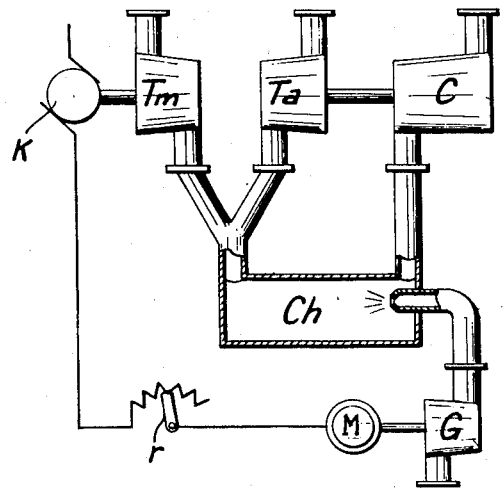
*fig:2*
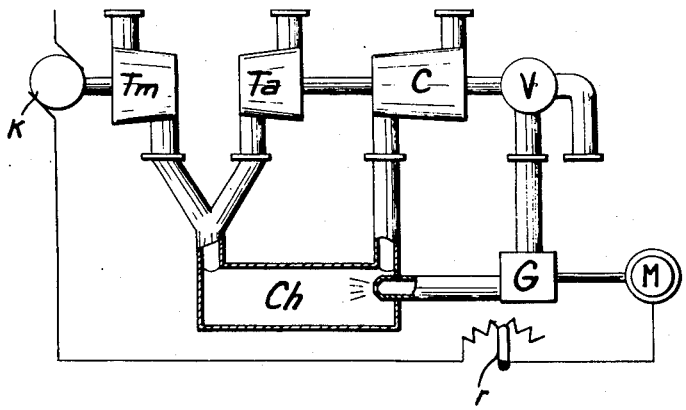
INVENTOR
marcel H. L. Sédille
By: Watson, Cole, Grindle & Watson
ATTORNEYS Patented Apr. 27, 1954

2,677,062

UNITED STATES PATENT OFFICE 2,677,062

GAS TURBINE POWER PLANT

Marcel Henri Louis Sédille, Paris, France, assignor to Societe Rateau (Societe Anonyme), Paris, France, a company of France Original application February 28, 1945, Serial No. 580,257, now Patent No. 2,621,476, dated December 16, 1952. Divided and this application November 3, 1952, Serial No. 318,476

Claims priority, application France March 29, 1941

3 Claims. (Cl. 290—2)

In a gas turbine plant operating on liquid or solid fuels, the fuel control is obtained with power losses which represent only a small fraction of the total power. In plants operating on gaseous fuels (blast furnace gas, coke furnace gas, producer gas, etc.) the gas compressor consumes an appreciable power which is a relatively important fraction of the total compression power. It is therefore necessary that the total compression work be effected with the smallest possible power loss at the different power outputs required from and delivered by the plant in order that the overall efficiency of the system remains good.

This application is a division of the pending application Serial No. 580,257, filed February 28, 1945 (now Patent No. 2,621,476, issued December 16, 1952), which is a division of my prior patent application Serial No. 434,986, filed March 16, 1942 (now Patent No. 2,374,239, issued April 24, 1945).

The present invention has for its object a gas turbine plant operating on a fuel which is in gaseous form at ordinary temperature, the compression of air necessary to the combustion of this fuel being effected in substantially constant working conditions of maximum efficiency of the air compressor for every power output supplied by the plant.

The invention has for another object a plant of the type defined in which besides the air compression, the gaseous fuel compression is effected with the smallest possible power loss.

Other objects of the invention will be apparent in the following description given by way of example with reference to the drawing in which:

Figures 1 and 2 are diagrammatical views showing various embodiments of the invention.

In the embodiment shown on Fig. 1, a motive turbine T$m$ drives an electric generator K for the supply of useful external power. An auxiliary turbine T$a$ mechanically separated from the motive turbine T$m$ and receiving its motive fluid in parallel with same drives a rotary air compressor C which delivers air under pressure into a combustion chamber C$h$ in which this air is heated before entering the turbines T$m$ and T$a$.

The combustion chamber C$h$ is supplied with a fuel which is in gaseous form at ordinary temperature. This fuel is compressed in a rotary gas compressor G which is mechanically separated from both turbine T$a$ and T$m$ and which is driven by an electric motor M receiving its power from a shunt winding connected to the electric generator K driven by the motive turbine T$m$. The regulation of the motor M is effected by means of a rheostat $r$.

It is known that a rotary compressor has a characteristic curve showing a point of maximum efficiency at a certain speed and for a constant intake pressure, as this is substantially the case for atmospheric air sucked in by the air compressor C.

It is further known, and this can be shown theoretically, that an auxiliary turbine driving the air compressor and mechanically separated from the motive turbine while supplied with hot air under pressure from a common combustion chamber can always be designed in such a manner that its rotary speed remains nearly constant, whatever be the power output required from and delivered by the motive turbine, i. e. whatever be the temperature of the hot air supplied to these turbines.

Now, according to the invention, the auxiliary turbine T$a$ is designed for running the air compressor C at a substantially constant rotary speed corresponding to the point of its characteristic curve at maximum efficiency, the air compressor delivering into the combustion chamber a quantity of air which is sufficient for the combustion of the total fuel supply corresponding to the maximum thermal energy that the motive turbine can transform into useful power.

The regulation of the thermal energy which is to be delivered to the plant is then obtained by means of the rheostat $r$ controlling the motor M which drives the gas compressor G at a more or less great speed according to the quantity of gaseous fuel which is to be supplied to the combustion chamber in order that the motive turbine may deliver the required power output.

In Figure 2, the compression of the combustible gas is effected in two stages connected in series. The low pressure portion of the compression is effected in a blower V coupled with the shaft of the compressor C. The high pressure portion is effected in a compressor G driven by the motor M controlled as described above.

In this case, the overall efficiency of the plant is increased by the fact that at least a part of the compression work of the gaseous fuel is effected in constant conditions of substantially optimum efficiency i. e. that the blower V remains nearly in working conditions corresponding to the value of maximum efficiency on its characteristic curve. If the quantity of gas sucked in by the high pressure compressor G varies the pressure at the outlet of the blower V varies but slightly. In this respect, an advantageous arrangement consists in effecting the low pressure portion of the gas compression in a centrifugal fan and the high pressure portion in a volumetric compressor. The control of the speed of the latter allows for example to reduce the supply with a good efficiency, the low pressure compressor remaining very near to its optimum working condition and the resulting loss being negligible.

In the embodiments shown on the figures, the gas turbine plant is of a definite type. However, the invention applies to all other types of gas turbine plants operating on gaseous fuel, whatever turbine arrangements and groupings are adopted, whether refrigerating means, regenerators, reheaters, etc. are utilized or not.

What I claim is:

1. In a gas turbine plant, the combination of a motive turbine for delivering useful power; an electric generator driven by said motive turbine; a rotary air compressor for supplying said turbine with air under pressure; a combustion chamber adapted to heat this air before its admission into said turbine by combustion of a gaseous fuel; an auxiliary turbine supplied with hot air under pressure from said combustion chamber said auxiliary turbine being mechanically separated from said motive turbine and being adapted to drive said air compressor at a substantially constant rotary speed substantially equal to the value of the operating point of said air compressor at maximum efficiency; at least one rotary gas compressor mechancially separated from said turbines and adapted to supply said combustion chamber with compressed fuel which is in gaseous form at ordinary temperature; an electric motor adapted to receive electric current from said generator for driving said gas compressor; and regulating means for said electric motor for controlling the gaseous fuel output sucked in by said gas compressor and delivered into said combustion chamber.

2. In a gas turbine plant, the combination of a motive turbine for delivering useful power; an electric generator driven by said motive turbine; a rotary air compressor for supplying said turbine with air under pressure; a combustion chamber adapted to heat this air before its admission into said turbine by combustion of a gaseous fuel; a rotary low pressure gas compressor mechanically coupled with said air compressor and adapted to deliver into said combustion chamber compressed fuel which is in gaseous form at ordinary temperature; an auxiliary turbine supplied with hot air under pressure from said combustion chamber, said auxiliary turbine being mechanically separated from said motive turbine and being adapted to drive said air compressor and said low pressure gas compressor at a substantially constant rotary speed substantially equal to the value of the operating point of said compressors at maximum efficiency; a high pressure rotary gas compressor mechanically separated from said turbines and adapted to further compress the gaseous fuel delivered by said low pressure gas compressor before its admission into said combustion chamber; an electric motor adapted to receive electric current from said generator for driving said high pressure gas compressor; and regulating means for said electric motor for controlling the gaseous fuel output sucked in by said high pressure gas compressor and delivered into said combustion chamber.

3. In a gas turbine plant, the combination of a motive turbine for delivering useful power; an electric generator driven by said motive turbine; a rotary air compressor for supplying said turbine with air under pressure; a combustion chamber adapted to heat this air before its admission into said turbine by combustion of a gaseous fuel; a rotary low pressure centrifugal fan mechanically coupled with said air compressor and adapted to deliver into said combustion chamber compressed fuel which is in gaseous form at ordinary temperature; an auxiliary turbine supplied with hot air under pressure from said combustion chamber said auxiliary turbine being mechanically separated from said motive turbine and being adapted to drive said air compressor and said centrifugal fan at a substantially constant rotary speed substantially equal to the value of the operating point of said air compressor and of said centrifugal fan at maximum efficiency; a volumetric rotary gas compressor mechanically separated from said turbines and adapted to further compress the gaseous fuel delivered by said centrifugal fan before its admission into said combustion chamber; an electric motor adapted to receive electric current from said generator for driving said volumetric gas compressor; and regulating means for said electric motor for controlling the gaseous fuel output sucked in by said volumetric gas compressor and delivered into said combustion chamber.

References Cited in the file of this patent

UNITED STATES PATENTS

| Number | Name | Date |
|---|---|---|
| 1,978,837 | Forsling | Oct. 30, 1934 |
| 2,193,114 | Seippel | Mar. 12, 1940 |
| 2,263,705 | Seippel | Nov. 25, 1941 |
| 2,303,381 | New | Dec. 1, 1942 |
| 2,374,239 | Sédille | Apr. 24, 1945 |
| 2,621,476 | Sédille | Dec. 16, 1952 |